(12) United States Patent
Yeh et al.

(10) Patent No.: US 8,302,116 B2
(45) Date of Patent: Oct. 30, 2012

(54) OPTICAL DISC DRIVE AND FLEXIBLE CABLE ASSEMBLY THEREIN

(75) Inventors: Shih-Lin Yeh, Hsinchu (TW); Cheng-Chung Hsu, Hsinchu (TW); Ming-Ping Lai, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 428 days.

(21) Appl. No.: 12/546,764

(22) Filed: Aug. 25, 2009

(65) Prior Publication Data

US 2010/0306790 A1    Dec. 2, 2010

(30) Foreign Application Priority Data

May 26, 2009 (CN) .......................... 2009 1 0202850

(51) Int. Cl.
*G11B 33/12* (2006.01)
*G11B 17/03* (2006.01)
(52) U.S. Cl. ........................ 720/652; 720/601
(58) Field of Classification Search .................. 720/600, 720/601, 613, 641, 648, 650, 652–655; 347/37–39
See application file for complete search history.

(56) References Cited

U.S. PATENT DOCUMENTS

| | | | | |
|---|---|---|---|---|
| 5,596,563 A | * | 1/1997 | Maeng | 720/668 |
| 5,892,747 A | * | 4/1999 | Okada et al. | 720/647 |
| 2004/0233564 A1 | * | 11/2004 | Kim | 360/39 |
| 2006/0005215 A1 | * | 1/2006 | Wu | 720/652 |
| 2006/0161940 A1 | * | 7/2006 | Arai et al. | 720/685 |

FOREIGN PATENT DOCUMENTS

JP    09044882 A * 2/1997

OTHER PUBLICATIONS

Machine-Assisted Translation of JP 09044882 A.*

* cited by examiner

*Primary Examiner* — Nathan Danielsen
(74) *Attorney, Agent, or Firm* — Rabin & Berdo, P.C.

(57) ABSTRACT

An optical disc drive including a chassis, a circuit board and a traverse is provided. The traverse includes a carrier, a pick-up head module, a spindle motor module and a flexible flat cable. The carrier has an opening. The pick-up head module is movably disposed in the opening. The spindle motor module disposed on the carrier is located at one side of the pick-up head module. The flexible flat cable disposed in the opening has two connection ends respectively connected to the pick-up head module and the circuit board. The pick-up head module located at a first position enables the flexible flat cable to have a bending portion protruding towards a direction opposite to the position of the spindle motor module. The pick-up head module located at a second position extends the bending portion. The first position is closer to the spindle motor module than the second position is.

8 Claims, 8 Drawing Sheets

OPTICAL DISC DRIVE AND FLEXIBLE CABLE ASSEMBLY THEREIN

This application claims the benefit of People's Republic of China application Serial No. 200910202850.9, filed May 26, 2009, the subject matter of which is incorporated herein by reference.

BACKGROUND OF THE INVENTION

1. Field of the Invention

The invention relates in general to an optical disc drive, and more particularly to an optical disc drive with a flexible flat cable.

2. Description of the Related Art

Along with the development of photo-electrical technology, photo-electrical products are getting more and more popular. Let an optical disc drive be taken as an example. An optical pick-up head is movably disposed in the optical disc drive. The optical pick-up head is connected to a circuit board via a flexible flat cable (FFC). The flexible flat cable is extended or bent along with the movement of the optical pick-up head.

Referring to FIG. 1A and FIG. 1B, a generally known optical disc drive is shown in FIG. 1A, and a partial cross-sectional view of the optical disc drive taken along line 1B-1B in FIG. 1A is shown in FIG. 1B.

The optical disc drive 100 includes a chassis 110, a circuit board 120 and a traverse 130. The circuit board 120 is disposed on a bottom board of the chassis 110. The traverse 130 disposed in the chassis 110 includes a carrier 131, a pick-up head module 133, a spindle motor module 135 and a flexible flat cable 137.

The carrier 131 has an opening 131a. The pick-up head module 133 is located above the circuit board 120 and movably disposed in the opening 131a. The moving direction of the pick-up head module 133 is denoted by the arrow in FIG. 1A. The spindle motor module 135 is disposed on the carrier 131 and located at one side of the pick-up head module 133. The spindle motor module 135 is used for carrying an optical disc (not illustrated) above the pick-up head module 133. The flexible flat cable 137 is disposed in the opening 131a and is extended or bent along with the movement of the pick-up head module 133.

Generally speaking, a protection film is adhered to two surfaces of the flexible flat cable by colloids. However, the colloids are always softened as being heated under a high temperature environment. As the internal space of the optical disc drive is getting smaller and smaller, the flexible flat cable being softened or too long may touch internal components of the optical disc drive easily as indicated in FIG. 1B. In addition, the flexible flat cable being softened or too long may bend upwards to touch the optical disc which is rotated at a high speed, such that the optical disc may be worn to affect the function of the optical disc as indicated in FIG. 1C. In order to prevent the flexible flat cable from bending upwards, conventionally, a reinforcement board 134 is disposed on one end of the flexible flat cable 137, or, the length of the reinforcement board 134 is increased. However, the reinforcement board 134 being prolonged may hit the carrier 131 or the chassis 110 of the optical disc drive easily so as to be detached from the optical pick-up head module 133, so that the end of the flexible flat cable 137 can not be connected to the pick-up head module 133. As a result, signals cannot be transmitted between the pick-up head module 133 and the circuit board 120.

Thus, how to provide a design effectively preventing the flexible flat cable from wearing the optical disc or being detached from the optical pick-up head module due to the deformation has become a focus to manufacturers.

SUMMARY OF THE INVENTION

The invention is directed to an optical disc drive. The disposition of the flexible flat cable effectively prevents the flexible flat cable and the optical disc from rubbing or contacting each other, and prevents the flexible flat cable from being detached from the pick-up head module due to the collision or vibration.

According to the present invention, an optical disc drive including a chassis, a circuit board and a traverse is provided. The circuit board is disposed on a bottom board of the chassis. The traverse disposed in the chassis includes a carrier, a pick-up head module, a spindle motor module and a flexible flat cable. The carrier has an opening. The pick-up head module is located above the circuit board and is movably disposed in the opening. The spindle motor module is disposed on the carrier and located at one side of the pick-up head module. The spindle motor module is used for carrying an optical disc above the pick-up head module. The flexible flat cable is disposed in the opening and has two connection ends respectively connected to the pick-up head module and the circuit board. The pick-up head module located at a first position enables the flexible flat cable to have a bending portion protruding towards a direction opposite to the position of the spindle motor module. The pick-up head module located at a second position extends the bending portion. The first position is closer to the spindle motor module than the second position is.

The invention will become apparent from the following detailed description of the preferred but non-limiting embodiments. The following description is made with reference to the accompanying drawings.

DETAILED DESCRIPTION OF THE INVENTION

Several embodiments with accompanying drawings are disclosed below for exemplifying an optical disc drive according to the present invention. However, anyone who is skilled in the related art of the present invention will understand that the drawings and the disclosure are for exemplification purpose only, not for limiting the scope of the present invention.

Figure 1A:
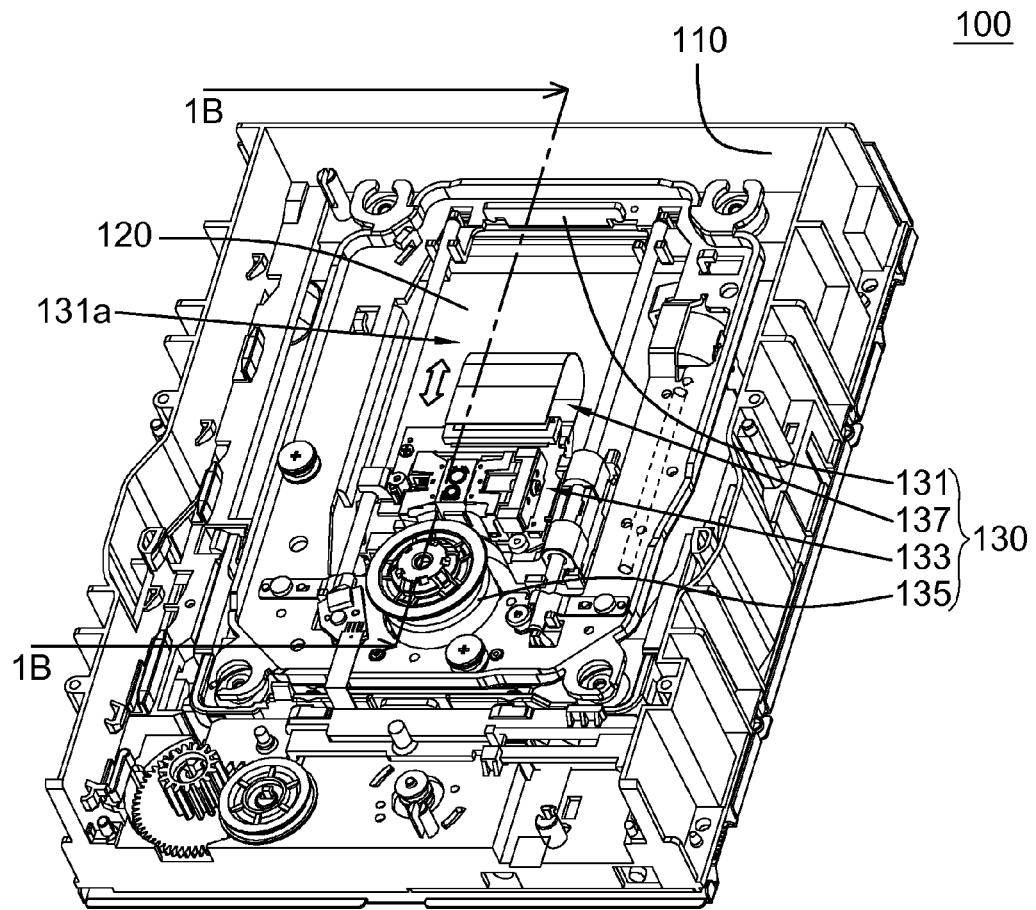
FIG. 1A (Prior Art) shows a generally known optical disc drive.
Figure 2A:
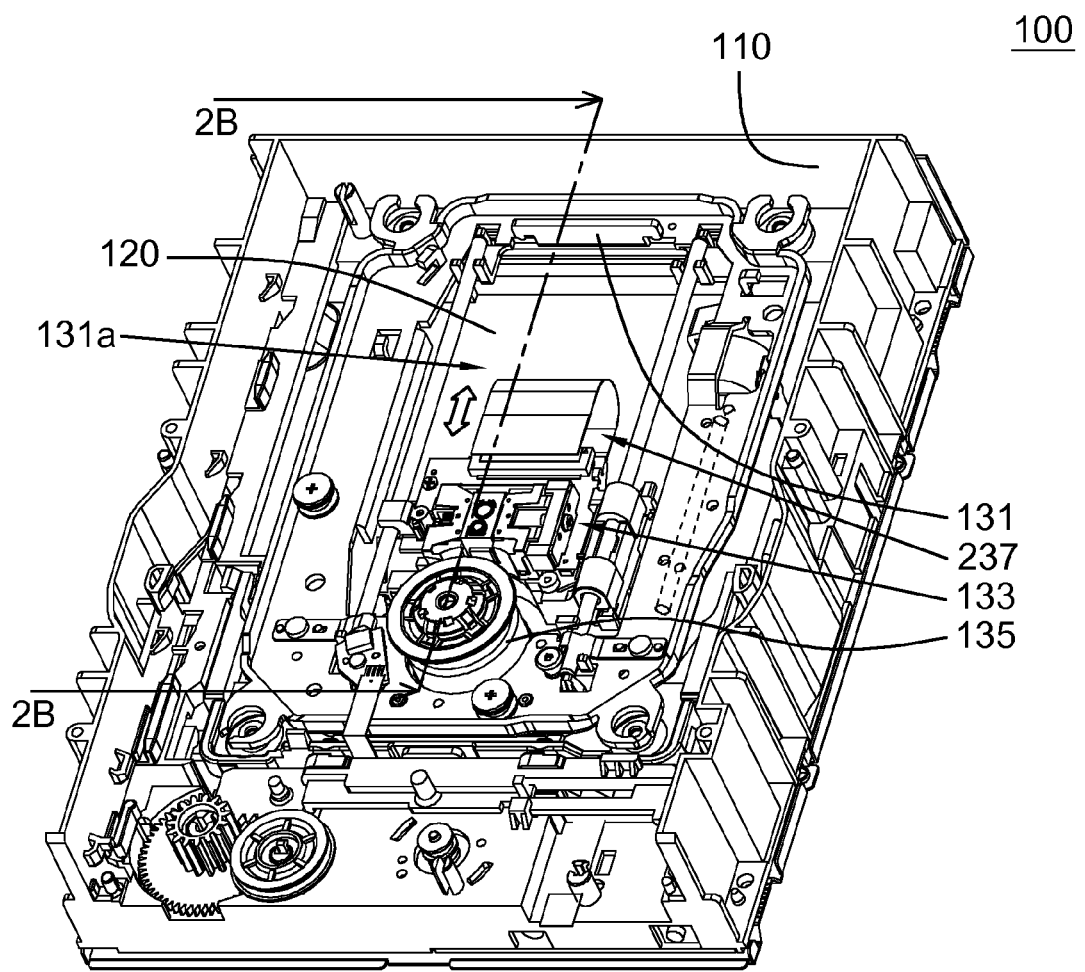
FIG. 2A shows an optical disc drive of the present invention.
Figure 2B:
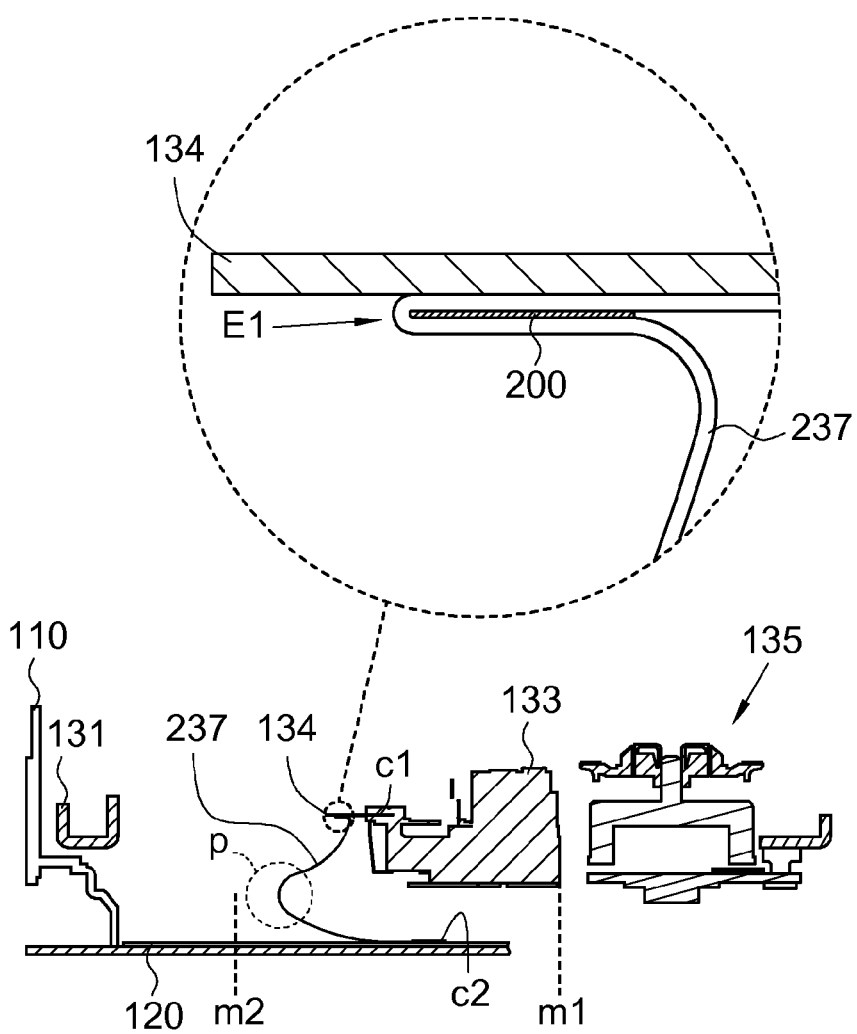
FIG. 2B shows a partial cross-sectional view of the optical disc drive taken along line 2B-2B in FIG. 2A.

Referring to FIG. 2A and FIG. 2B, an optical disc drive according to an embodiment of the present invention is shown in FIG. 2A, and a partial cross-sectional view of the optical disc drive taken along line 2B-2B in FIG. 2A is shown in FIG. 2B. The same reference numbers in FIG. 1A and FIG. 2A denote the same components and are not repeatedly described herein.

The optical disc drive 100 according to the present embodiment of the invention includes a flexible flat cable 237 and a reinforcement board 134 which are disposed in an opening 131a. The flexible flat cable 237 includes a conductor (not illustrated) and two protection layers (not illustrated), for example, and the two protection layers are respectively disposed on two opposite surfaces of the conductor by colloids. The flexible flat cable 237 has two connection ends c1 and c2 which are respectively connected to the pick-up head module 133 and the circuit board 120 for transmitting a signal. In the present embodiment of the invention, at least a portion of the flexible flat cable 237 is fixed on the reinforcement board 134, and the flexible flat cable 237 is bent to form a folded edge E1.

Figure 2C:
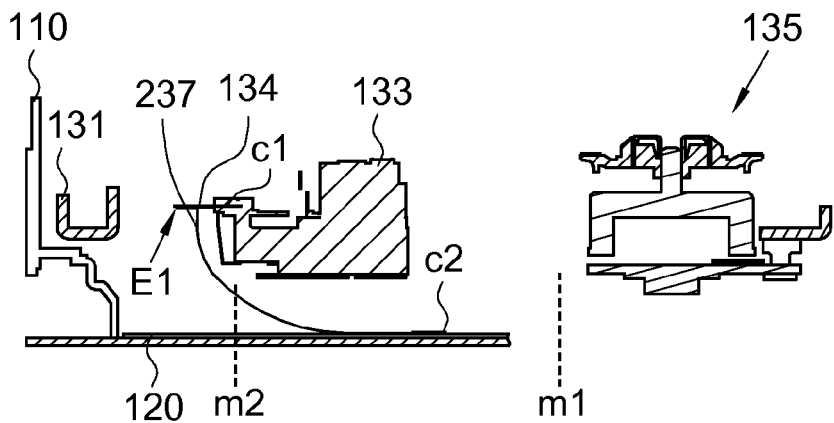
FIG. 2C shows the pick-up head module in FIG. 2B being moved.

In FIG. 2B, the folded edge E1 is located around an edge where the reinforcement board 134 and the flexible flat cable 237 are fixed mutually, and the folded edge E1 faces a direction opposite to the position of the spindle motor module 135. Preferably, portions of the flexible flat cable 237 located at two sides of the folded edge E1 are mutually fixed by a colloid 200, for example. However, the present invention is not limited thereto. Through the folded edge E1, the pick-up head module 133 located at a position m1 enables the flexible flat cable 237 to form a bending portion p. In addition, as indicated in FIG. 2C, the pick-up head module 133 located at a position m2 extends the bending portion p of the flexible flat cable 237, so that the flexible flat cable will not contact the carrier 131 or the optical disc being rotated.

In the present embodiment of the invention, the flexible flat cable 237 is only partly fixed on the reinforcement board 134. However, the flexible flat cable 237 can also completely cover the reinforcement board 134 to form a larger folded edge.

Figure 3A:
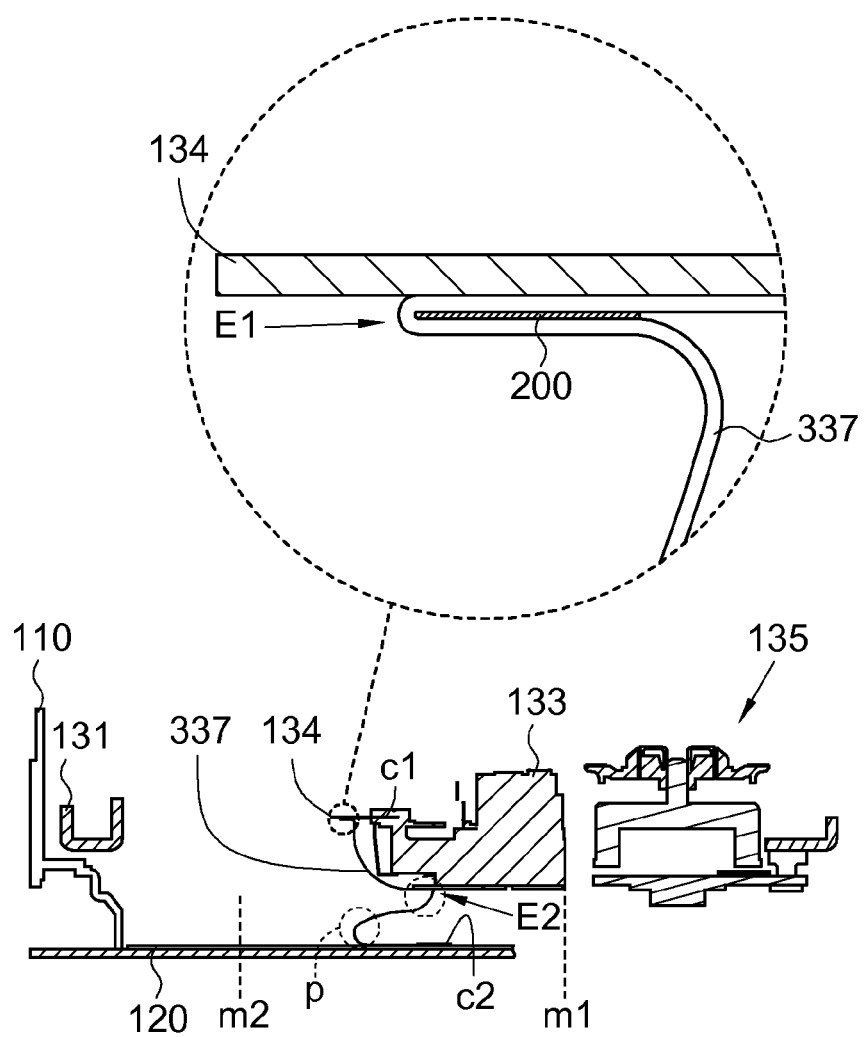
FIG. 3A shows a partial cross-sectional view of an optical disc drive according to another embodiment of the present invention.
Figure 3B:
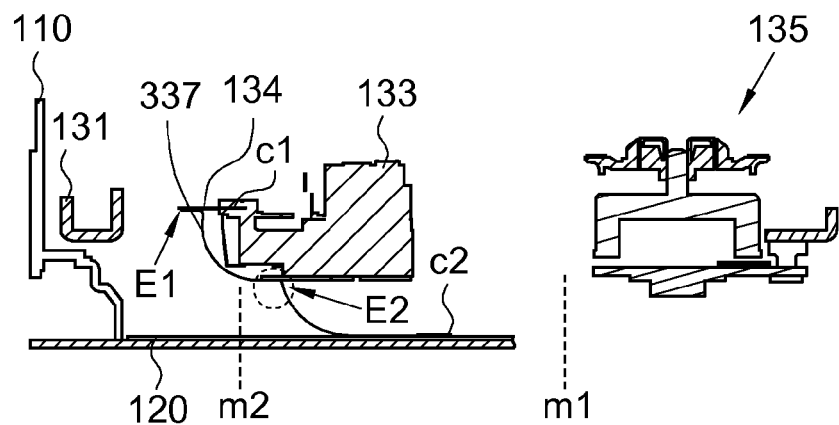
FIG. 3B shows the pick-up head module in FIG. 3A being moved.

Furthermore, the number and the position of the folded edge can be adjusted to fit different needs as exemplified below. As indicated in FIG. 3A and FIG. 3B, the folded edge E1 is located around the edge where the reinforcement board 134 and the cable 337 are fixed mutually, and the folded edge E1 faces the direction opposite to the position of the spindle motor module 135. Moreover, a portion of the flexible flat cable 337 is fixed to the bottom of the pick-up head module 133 as denoted by E2 in FIG. 3A. In the present embodiment of the invention, through the disposition of two fixing portions (E1 and E2), the flexible flat cable 337 forms a bending portion p when the pick-up head module 133 is located at the position m1. In addition, as indicated in FIG. 3B, the pick-up head module 133 located at the position m2 extends the bending portion p of the flexible flat cable 137, so that the bending portion p will not contact the carrier 131.

Figure 4A:
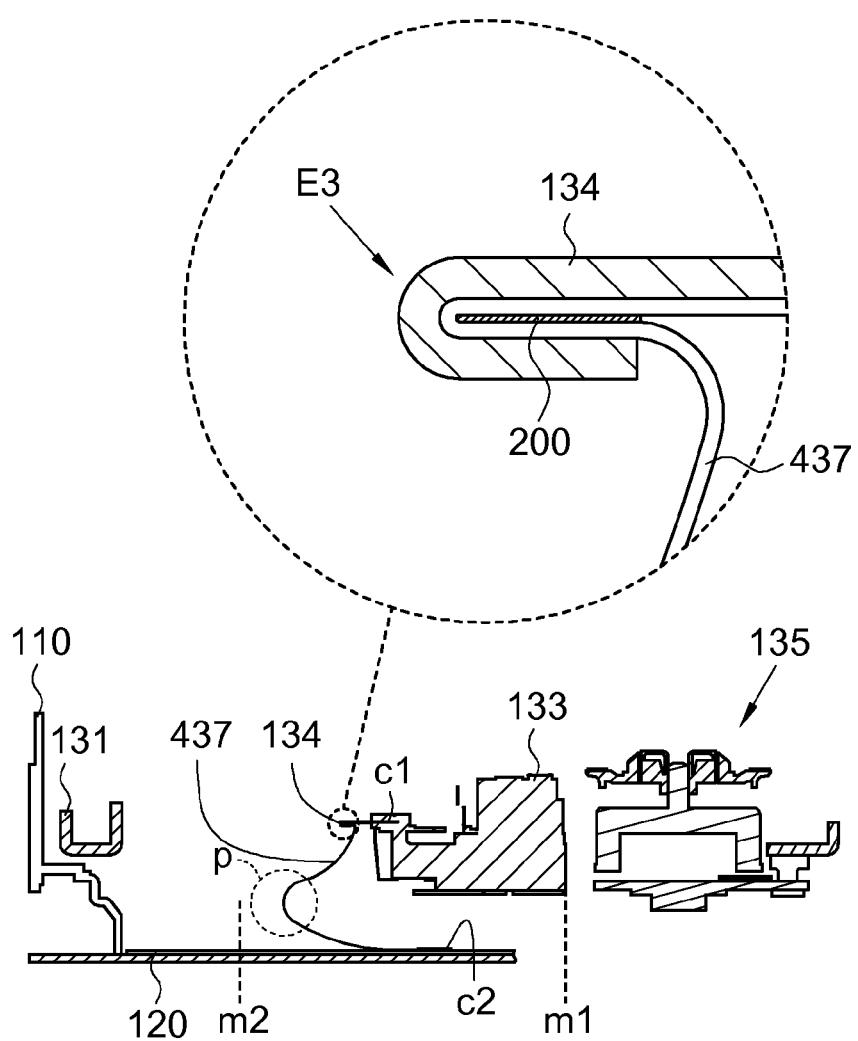
FIG. 4A shows a partial cross-sectional view of an optical disc drive according to yet another embodiment of the present invention.
Figure 4B:
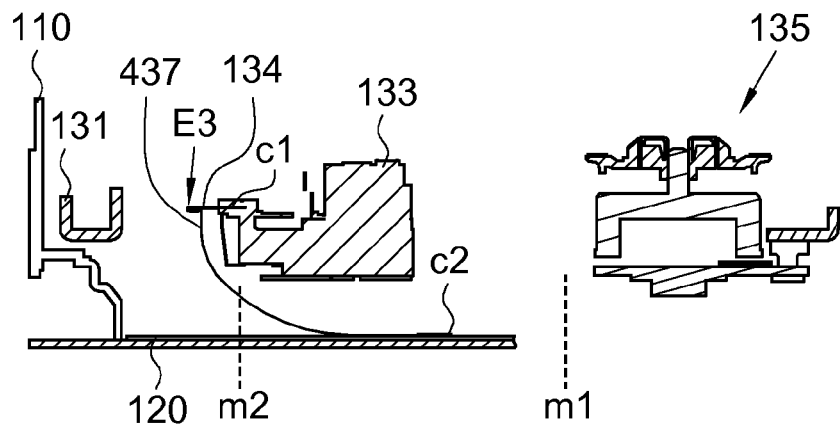
FIG. 4B shows the pick-up head module in FIG. 4A being moved.

Or, as indicated in FIG. 4A and FIG. 4B, the reinforcement board 134 and the flexible flat cable 437 are folded together so as to form a folded edge E3 at the flexible flat cable 437 and the reinforcement board 134 concurrently. Therefore, the flexible flat cable 437 and the reinforcement board 134 are more firmly coupled together to avoid being separated from each other.

Figure 5A:
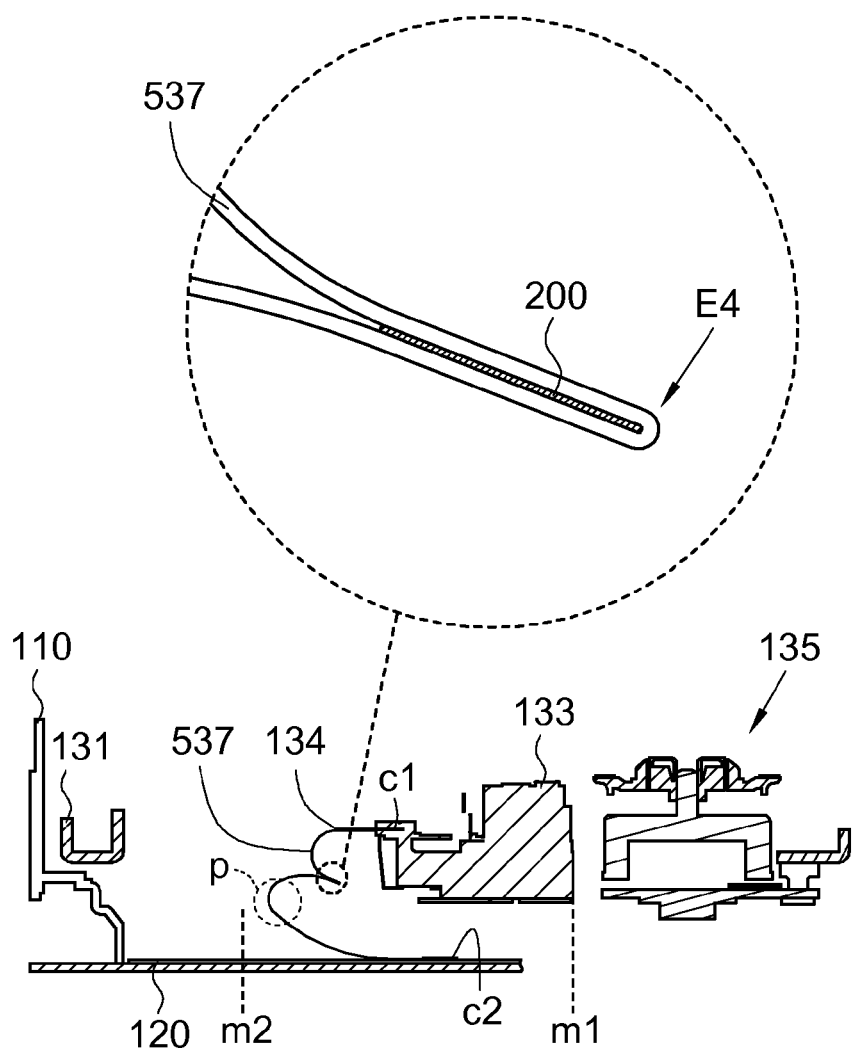
FIG. 5A shows a partial cross-sectional view of an optical disc drive according to yet another embodiment of the present invention.
Figure 5B:
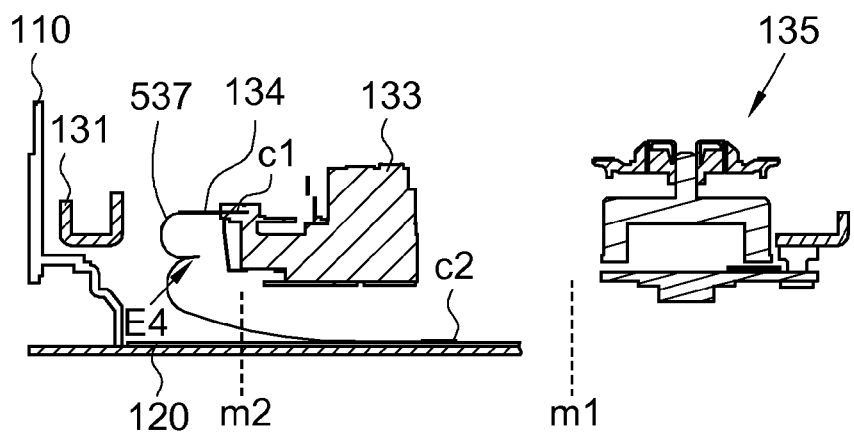
FIG. 5B shows the pick-up head module in FIG. 5A being moved.

As indicated in FIG. 5A and FIG. 5B, the folded edge E4 is located at a portion where the flexible flat cable 537 is not overlapped with the reinforcement board 134, and the folded edge E4 faces the position of the spindle motor module 135.

Figure 1B:
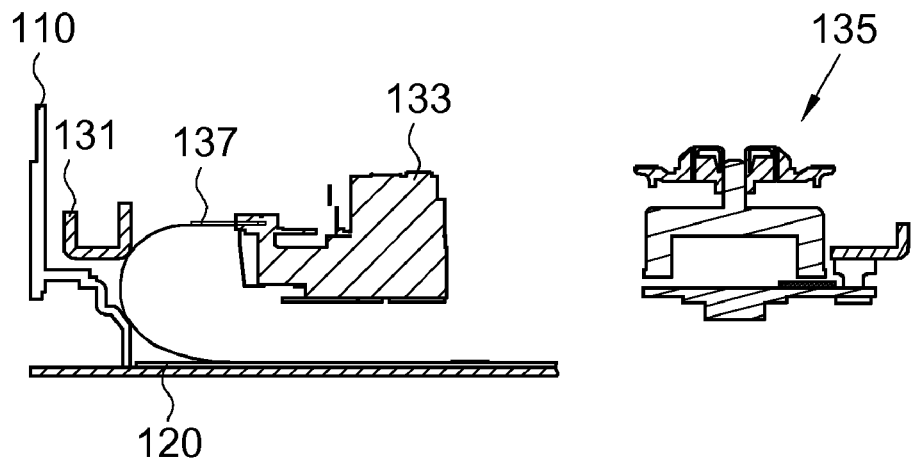
FIG. 1B (Prior Art) shows a partial cross-sectional view of the optical disc drive taken along line 1B-1B in FIG. 1A.
Figure 1C:
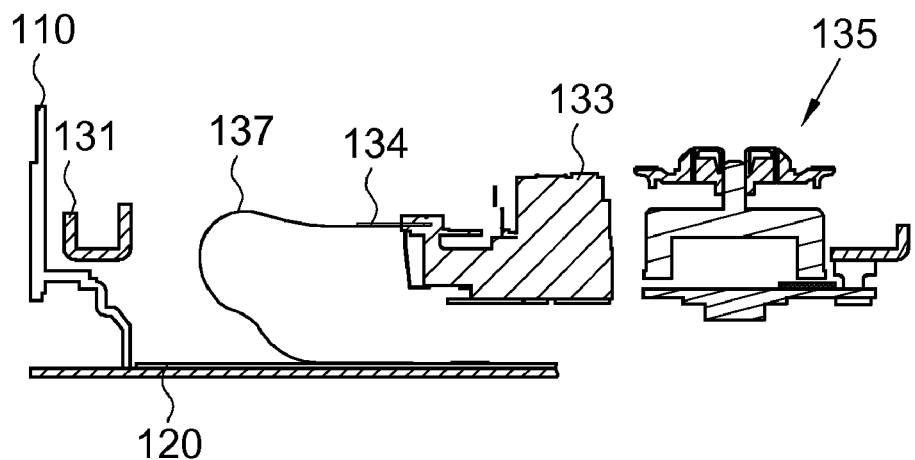
FIG. 1C (Prior Art) shows the pick-up head module in FIG. 1B being moved.

As indicated in FIG. 2B~FIG. 5A, the pick-up head module 133 located at the position m1 enables the bending portion p of the flexible flat cables 237, 337, 437 and 537 to protrude towards the direction opposite to the position of the spindle motor module 135, so that the flexible flat cable will not bend upwards to contact the optical disc like what the flexible flat cable in FIG. 1C does. The bending portion p herein is adjacent to the circuit board 120. As indicated in FIG. 2C~FIG. 5B, the pick-up head module 133 located at the position m2 extends the bending portion p of the flexible flat cable, so that the flexible flat cable will not contact the carrier 131 like what the flexible flat cable in FIG. 1B does.

Despite the flexible flat cable in each of the above embodiments is deformed because of getting softened due to the heat, the folded edge still effectively restricts the deformation of the flexible flat cable. Therefore, the condition that the flexible flat cable touches other internal components of the optical disc drive to become worn or be detached from the connection ends c1 and c2 can be avoided. Also, in the above embodiments, the length of the reinforcement board does not need to be increased. Compared with the conventional flexible flat cable with a prolonged reinforcement board, even under the circumstances that the size of the optical disc drive is reduced to shrink the space for receiving the flexible flat cable accordingly, the conditions that the reinforcement board of each embodiment of the present invention touches the carrier 131 or the chassis 110 can be reduced. Therefore, the condition that the flexible flat cable is detached from the pick-up head module 133 due to the collision or vibration can be avoided.

Each embodiment has the reinforcement boards 134 for restricting the moving direction of the flexible flat cable. However, through appropriate arrangement of the folded edge and the fixing portion, the moving direction of the flexible flat cable still can be restricted without the reinforcement board.

Figure 6A:
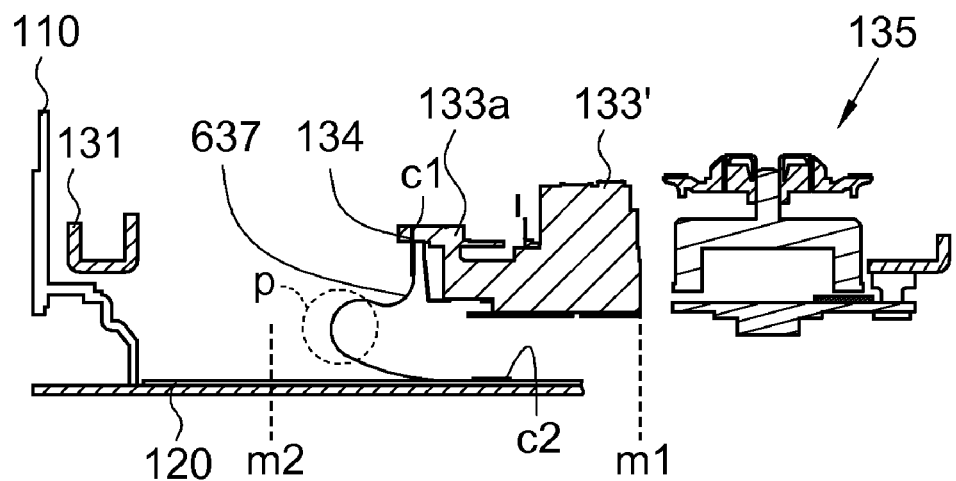
FIG. 6A shows a partial cross-sectional view of an optical disc drive according to yet another embodiment of the invention.
Figure 6B:
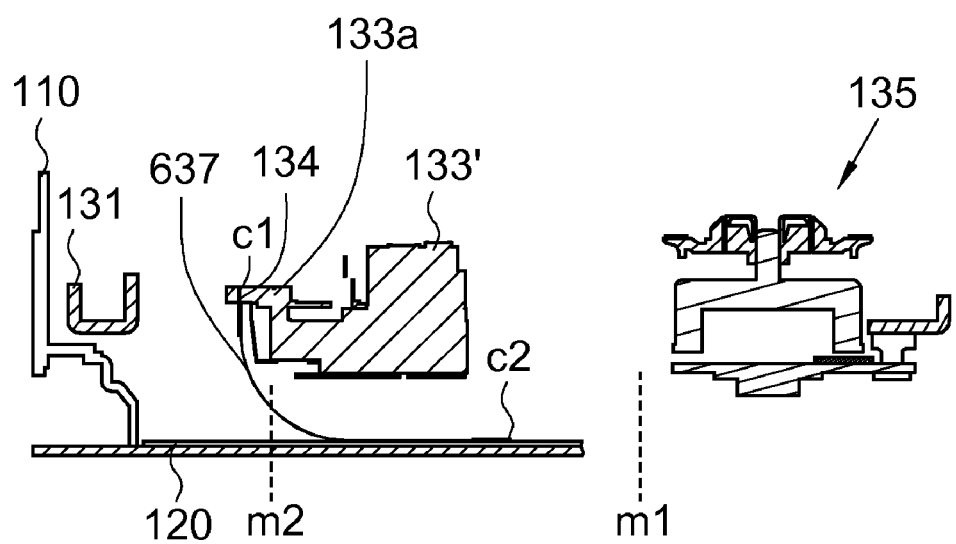
FIG. 6B shows the pick-up head module in FIG. 6A being moved.

Except the embodiments disclosed above, through the disposition of the flexible flat cable 637 in FIG. 6A and FIG. 6B, the condition that the flexible flat cable 637 rubs or touches the optical disc can be effectively avoided. In addition, the condition that the flexible flat cable 637 is detached from the pick-up head module 133 due to the collision or vibration can also be avoided.

As indicated in FIG. 6A and FIG. 6B, the pick-up head module 133' includes a connection port 133a. The slot of the connection port 133a faces the circuit board 120. The connection end c1 connected to the pick-up head module 133 is inserted into the slot of the connection port 133a. Thus, parts of the reinforcement board 134 and the flexible flat cable 637 which are connected to the connection end c1 are perpendicular to the circuit board 120. The pick-up head module 133' located at the position m1 enables the bending portion p of the flexible flat cable 637 that is adjacent to the circuit board 120 to protrude towards the direction opposite to the position of the spindle motor module 135. Furthermore, as indicated in FIG. 6B, the pick-up head module 133' located at the position m2 enables the flexible flat cable 637 to extend the bending portion p of the flexible flat cable 637, so that the flexible flat cable 637 will not touch the carrier 131 like what the flexible flat cable in FIG. 1B does.

According to the optical disc drive disclosed in the above embodiments of the invention, the disposition of the flexible flat cable prevents the optical disc from contacting with the flexible flat cable to become worn. Also, the length of the reinforcement board does not need to be increased, so that the conditions that the flexible flat cable is detached due to the collision or vibration caused by the reinforcement board can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disc drive, comprising:
   a chassis;
   a circuit board disposed on the chassis and having a connector; and
   a traverse disposed in the chassis, wherein the traverse comprises:
      a carrier having an opening;
      a pick-up head module movably disposed in the opening and having a connector positioned above a bottom of pick-up head module; and
      a spindle motor module disposed on the carrier and located at one side of the pick-up head module, wherein the spindle motor module is used for carrying an optical disc above the pick-up head module; and
   a flexible flat cable disposed in the opening and having two connection ends connected to the connector of the pick-up head module and the connector of the circuit board, respectively, wherein a portion of the flexible flat cable other than the connection end connected to the connector of the pick-up head module is fixed to the bottom of the pick-up head module;
   wherein the pick-up head module located at a first position enables the flexible flat cable to have a bending portion, the bending portion protrudes towards a direction opposite to the position of the spindle motor module, the pick-up head module located at a second position extends the bending portion, and the first position is closer to the spindle motor module than the second position is.

2. The optical disc drive according to claim 1, wherein the pick-up head module comprises a connection port, a direction of a slot of the connection port is perpendicular to the circuit board, and the connection end connected to the pick-up head module is inserted into the slot of the connection port.

3. The optical disc drive according to claim 1, wherein the flexible flat cable is folded to form a folded edge.

4. The optical disc drive according to claim 3, wherein portions of the flexible flat cable located at two sides of the folded edge are mutually fixed.

5. The optical disc drive according to claim 1, comprising:
   a reinforcement board, wherein at least a portion of the flexible flat cable is fixed on the reinforcement board.

6. The optical disc drive according to claim 5, wherein the reinforcement board and the flexible flat cable are folded together to form a folded edge.

7. The optical disc drive according to claim 6, wherein the folded edge is located around an edge where the reinforcement board and the flexible flat cable are mutually fixed, and the folded edge faces the direction opposite to the position of the spindle motor module.

8. The optical disc drive according to claim 6, wherein the folded edge is located at a position where the flexible flat cable is not overlapped with the reinforcement board and the folded edge faces the position of the spindle motor module.

* * * * *